United States Patent [19]

De La Mare et al.

[11] 4,397,998
[45] Aug. 9, 1983

[54] CURABLE EPOXY COMPOSITIONS SUITABLE FOR USE IN RIM PROCESSES

[75] Inventors: Harold E. De La Mare; Thomas F. Brownscombe, both of Houston, Tex.

[73] Assignee: Shell Oil Company, Houston, Tex.

[21] Appl. No.: 330,413

[22] Filed: Dec. 14, 1981

[51] Int. Cl.³ .............................................. C08L 63/00
[52] U.S. Cl. .................................. 525/420.5; 523/456; 525/407; 525/456; 525/523; 525/532
[58] Field of Search ................ 523/456; 525/407, 532, 525/420.5

[56] References Cited

U.S. PATENT DOCUMENTS

| | | | |
|---|---|---|---|
| 2,450,940 | 4/1944 | Cowan et al. | 260/404.5 |
| 2,633,458 | 3/1953 | Shokal | 260/45.2 |
| 3,188,362 | 6/1965 | Delmonte | 525/532 |
| 3,336,241 | 8/1967 | Shokal | 260/2 |
| 3,373,221 | 3/1968 | May | 260/837 |
| 3,377,406 | 4/1968 | Newey et al. | 260/837 |
| 3,431,237 | 3/1969 | Harry | 525/407 |
| 3,492,269 | 1/1970 | Janssen et al. | 260/47 |
| 4,026,858 | 5/1977 | Andrews | 523/456 |
| 4,125,503 | 11/1978 | McCarty | 523/456 |

*Primary Examiner*—Paul Lieberman
*Attorney, Agent, or Firm*—Norris E. Faringer

[57] ABSTRACT

The present invention provides a rapid curing epoxy composition, suitable for RIM processes, which exhibits unexpectedly high modulus and strength and stability which comprises (1) an epoxy resin,
(2) a polyamine or polyamide,
(3) a catalyst selected from the group consisting of alkali and alkaline earth metal salts of selected acids, and
(4) a polyalkylene ether glycol.

16 Claims, No Drawings

CURABLE EPOXY COMPOSITIONS SUITABLE FOR USE IN RIM PROCESSES

BACKGROUND OF THE INVENTION

This invention is directed to curable high modulus epoxy reaction injection molding (RIM) compositions. The invention further relates to the manufacture of molded articles by reaction injection molding of catalyzed epoxy-polyamine compositions.

The use of urethane technology in RIM systems is well-known. In RIM technology the mixed urethane foam ingredients are injected into a mold cavity through a runner and a gate at low pressure, usually about 20 psi, where they react quickly to produce molded articles. Large parts can thusly be produced very quickly at relatively low mold pressures. Such elastomers normally comprise the reaction product of an aromatic polyisocyanate, a polyol and a chain extending agent.

Molding compositions of epoxy resins on the other hand are usually prepared by placing an epoxy composition comprising an epoxy resin and curing agent in a suitable mold, with or without reinforcement, and curing the composition under pressure and elevated temperature. These cured epoxy compositions exhibit good physical and chemical properties. It would be desirable; however, to be able to produce cured articles faster from epoxy compositions which exhibit physical and mechanical properties which are equal or superior to standard casting resins.

U.S. Pat. No. 3,492,269 is directed to a process for hardening epoxy resins using certain inorganic metal salt accelerators such as NaCl or NaBr, for the curing of said epoxy resins. These cured compositions cannot be used in RIM applications because of the relatively slow gel times. See, for example, Example 3 wherein gel times are in excess of 32 minutes. Further, although oxygenated organic solvents are disclosed as solvents for the metal salts, their use is said to be generally unnecessary.

An epoxy composition has now been found that exhibits a high modulus (ca 400,000 psi) and high strength (ca 10,000 psi) when produced via RIM techniques.

SUMMARY OF THE INVENTION

In other words, the present invention is directed to novel compositions wherein a polyalkylene glycol is used in combination with special amines and selected metal salts to cure epoxy resins in a RIM process. It was unexpectedly discovered that this special combination produces mechanical properties equivalent to those of traditional cure techniques yet can be cured extremely fast (30 seconds to 10 minutes). Further, the mechanical properties attained at high temperatures may be obtained at low temperatures more quickly with the instant curing-promoter system.

Accordingly, the present invention provides a rapid curing epoxy composition, suitable in RIM processes, which exhibits unexpectedly high modulus and high strength and stability which comprises (1) an epoxy resin, (2) a polyamine, (3) a catalyst selected from the Group I and Group II metal salts, and (4) a polyalkylene ether glycol.

DESCRIPTION OF THE PREFERRED EMBODIMENTS

The present invention provides a rapid curing, storage stable, thermosetting composition which is especially suitable for use in RIM processes and which, when cured, exhibits unexpectedly high modulus and strength, comprises (1) an epoxy compound containing more than one vicinal epoxy group, (2) a curing amount of an amino compound containing at least three amino hydrogens, and preferably a cycloaliphatic diamine, (3) a catalytic amount of a Group I (alkali metal) or Group II (alkaline earth metal) metal salt selected from the group consisting of nitrates, iodides, thiocyanates, alkoxides, and perchlorates, sulfonates and (4) a polyalkylene ether glycol.

Polyepoxides

Suitable polyepoxides used to prepare the present compositions comprise those compounds containing at least one vicinal epoxy or oxirane group, i.e., at least one

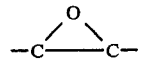

group. These polyepoxides may be saturated or unsaturated, aliphatic, cycloaliphatic, aromatic or heterocyclic and may be substituted if desired with non-interfering substituents such as halogen atoms, hydroxyl groups, ether radicals, and the like. They may also be monomeric or polymeric.

For clarity, many of the polyepoxides and particularly those of the polymeric type are described in terms of epoxy equivalent values. The meanings of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that so much of the disclosure of that patent relative to examples of polyepoxides is incorporated by reference into this specification.

Other suitable polyepoxides are disclosed in U.S. Pat. No. 3,373,221 and U.S. Pat. No. 3,377,406 and so much of the disclosure relevant to examples of epoxy compounds is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the phenol is Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols have been or are saturated.

An idealized structural formula representing the preferred saturated epoxy compounds is as follows:

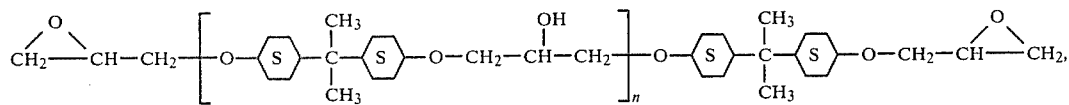

wherein n has a value so that the average molecular weight of the saturated polyepoxide is from about 350 to about 3,000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

Other examples include the glycidyl novolac resins, i.e., phenolaldehyde condensates, as described in U.S. Pat. No. 2,658,885.

An exceptionally suitable polyepoxide comprises a blend of (a) a diglycidyl ether of 2,2-bis(4-hydroxyphenyl) propane and (b) a diglycidyl ether of hydrogenated 2,2-bis(4-hydroxyphenyl) propane. In general, the blend will vary on a weight basis of a:b of from about 50:50 to about 80:20, with a 75:25 blend being preferred.

AMINO-CONTAINING COMPOUNDS

Suitable amino-containing curing agents comprise the aliphatic and cycloaliphatic polyfunctional amines and the polyamides.

Suitable polyfunctional amines may have the following general structure:

wherein each R is an alkyl, aryl or alkaryl radical of up to about 8 carbon atoms and x has a value of from about 0 to about 10, and preferably 1 to 3.

Examples of suitable such polyfunctional amines include, among others, diethylenetriamine and $H_2N$-$CH_2$-$CH_2$-$NH$-$CH_2$-$CH_2$-$NH_2$, DETA (diethylene triamine), TETA (triethylene tetra-amine) as well as cycloaliphatic amines such as diaminocyclohexane and

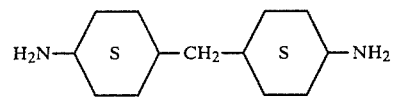

and aromatic polyamines such as methylene dianiline (MDA),

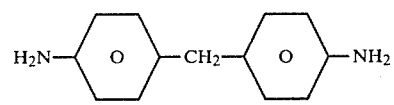

and meta phenylene diamine.

Very suitable polyfunctional amines are the polyoxypropyleneamines (aliphatic, terminally-branched, primary di- and tri-amines, structurally derived from polypropylene glycols and triols) commercially available under the trade designation "JEFFAMINE". A typical structure is as follows:

     (1)

wherein x has an approximate value of from about 2.5 to about 3.5.

Polyamides which are suitable for use in the present compositions may be saturated or unsaturated as well as monomeric or polymeric.

Polyamides which are especially useful in the present compositions are those derived from polymeric fatty acids and aliphatic polyamines. Polyamides of this type are disclosed in U.S. Pat. No. 2,450,940. Typically, these polyamides are those made from polymeric fatty acids containing up to about 22 carbon atoms in the monomeric acid with ethylene diamine and/or diethylene triamine. It will be appreciated that polyamide resins may have terminal amine groups or terminal carboxy groups or contain molecules in which some of the terminal groups are amine groups while others are carboxyl groups.

The polymeric fatty acids employed in preparing the polyamides are those resulting from the polymerization of drying or semi-drying oils, or the free acids or simple aliphatic alcohol esters of such acids. Suitable drying or semi-drying oils include soybean, linseed, tung, perilla, oiticica, cottonseed, corn, tall, sunflower, safflower, dehydrated castor oil, and the like. In the polymerization process for the preparation of the polymeric fatty acids, the fatty acids with sufficient double bond functionality combine for the most part, probably by a Diels Alder mechanism, to provide a mixture of dibasic and higher polymeric acids. The acids with insufficient functionality to react remain as monomers and may be wholly or partially removed, for example by distillation. The residue after distillation consists of the desired polymeric acids and this mixture is used for the preparation of the polyamide resin. In place of this method of polymerization, any other method of polymerization may be employed whether the resultant polymer possesses residual unsaturation or not. The term "polymeric fatty acids" as used herein, is intended to include the polymerized mixture of acids obtained, which mixture usually contains a predominant portion of dimeric acids, a smaller quantity of trimeric and higher polymeric acids, and some residual monomer.

These polymeric fatty acids may be reacted with a variety of aliphatic polyamines for the production of the polyamide. The amidification reaction may be carried out under the usual conditions employed for this purpose, as will be evident from the examples. Polyamides of this type generally have molecular weights varying from 1,000 to 10,000 and are resistant to the corrosive action of water, alkali, acids, oils, greases, and organic solvents. The melting points vary, depending upon the reactants and the reaction conditions. Where aliphatic diamines, such as ethylene diamine, are employed for the preparation of the polyamide the resin may melt within the approximate range of 100°-120° C., and usually within the range of 100°-105° C.

Higher melting polyamide resins, for example melting within the range of 130°-215° C., may be made by employing a mixture of polymeric fatty acids and other polybasic acids, the latter having at least two carboxyl groups which are separated by at least 3 and not more than 8 carbon atoms. Typical of these polybasic acids are the aliphatic acids, glutaric, adipic, pimelic, suberic, azelaic, and sebacic, and the aromatic acids, terephthalic, and isophthalic acids. The melting point of the copolymer resin may vary within the range previously indicated, depending upon the particular reactants, relative ratios thereof, as well as the reaction conditions.

Low melting polyamide resins melting within the approximate range of 25°-90° C. may be prepared from polymeric fatty acids and aliphatic polyamines having at least 3 atoms intervening between the amine groups principally involved in the amidification reaction. These three atoms may be carbon atoms or hetero atoms. Typical of the polyamines which may be used are diethylene triamine, triethylene tetramine, tetraethylene pentamine, 1,4-diaminobutane, 1,3-diaminobutane, hexamethylene diamine, 3-(N-isopropylamino)-propylamine, 3,3'-imino-bispropylamine, and the like. A peferred group of these low melting polyamides are derived from polymeric fatty acids, and diethylene triamine and are liquid at room temperature.

Suitable such polyamides are commercially available under the trade designation of VERSAMID® Polyamide resins and are amber-colored polyamides having a molecular weight ranging from about 3,000 to about 10,000 and a softening point from about below room temperature to 190° C. and prepared by condensing polymerized unsaturated fatty acids (e.g., dilinoleic acid) with aliphatic polyamines such as diethylene triamine.

The preparation of such VERSAMID® polyamide resins is well-known and by varying the acid and/or the functionality of the polyamine, a great variety of viscosities, molecular weights and levels of active amino groups spaced along the resin molecule can be obtained.

Typically, the VERSAMID® polyamide resin have amine values from about 50 to 400; Gardner color (max.) of 8-10; and viscosities of from about 1 to 30 poises.

Polyamines which are especially suitable in the present compositions are those wherein the NH functionality is ≦3 and contain active hydrogens.

Although useful for some applications, the polyamides are not preferred; however, blends of polyamides with polyamines are more suitable. Preferred polyamines are the aliphatic and cycloaliphatic amines, especially the cycloaliphatic diamines, such as

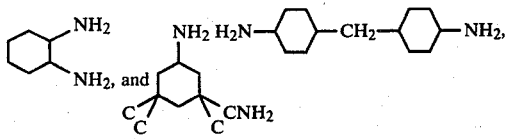

The amount of polyamine or polyamide employed will vary somewhat, but will be a curing amount. In general, the amount of polyamine will be that amount required to furnish one amino hydrogen per epoxy group (stoichiometric amount), although up to about 50% excess of polyepoxide may be employed and up to about 100% excess of polyamine or polyamide may be employed.

CATALYST

Suitable catalysts which are operable in the present compositions include the Group I and Group II metal salts wherein the anion is selected from nitrates, iodides, thiocyanates, alkoxides and perchlorates, with the nitrates, iodides, thiocyanates, and sulfonates being preferred.

The preferred Group I metal (cation) is lithium and the preferred Group II metals are calcium and magnesium with calcium being especially preferred.

Accordingly, preferred catalyst salts are lithium iodide, lithium nitrate, calcium nitrate, calcium perchlorate and magnesium nitrate. Excellent results are obtained with calcium nitrate.

In general, a catalytic amount of salt is employed. For most applications, the catalyst will be used from about 0.05 to about 5.0 parts by weight per 100 parts by weight of polyepoxide (phr), with from 0.1 to 3.0 phr being preferred and from about 0.5 to about 2.0 phr being especially preferred.

The other essential component is a stabilizer/solvent composition which comprises a polyalkylene glycol or polyalkylene ether glycol having an average molecular weight between about 200 and about 1500 and is preferably a polyethylene glycol or polypropylene glycol having an average molecular weight between about 400 and 1000.

The amount of polyalkylene glycol will vary somewhat depending upon the particular epoxy resin, aliphatic amine, and/or metallic salt; however, the amount will generally be, on a weight ratio of polyalkylene glycol to metallic catalyst of from about 1:3 to about 6:3. Expressed another way, the polyalkylene glycol may be employed in amounts ranging from about 0.1 to about 3 phr based in epoxy resin.

As noted herein before, the present compositions are especially adapted to RIM techniques because of the rapid curing possible. Accordingly their use in RIM systems will be described as a preferred embodiment.

In general, RIM techniques and equipment are well known and need not be described in detail herein.

Simply, the epoxy resin and the metallic salt and polyalkylene glycol, are mixed and added to the resin reservoir of a RIM apparatus. The polyamide is added to the curative reservoir. In some cases, the catalyst can be added to the curative reservoir. In general, the resin mixture is maintained at about 45° to about 70° and the curative (polyamine) is brought to about 30° to about 50° C. The temperatures are representative and typical only and the temperature range may be expanded according to the particular components employed. Then by means of a dispensing and metering means, the two streams from the reservoir are brought under high pressure into a mixing head (1000 to 3000 psi, preferably about 1200 to 2000 psi). The mix head is opened on a predetermined signal and the two streams flow together under turbulent mixing conditions and flow directly into the mold. After a suitable time, e.g., 30 to 300 seconds, at about 80° to about 160° C., the mold is opened and the article removed.

Of course, other materials may be mixed or added to one or both of the reaction schemes, including plasticizers, stabilizers, extenders, oils, resins, plastics, elastomers, tars, asphalts, pigments, reinforcing agents, thixotropic agents, antioxidants, mold release agents, etc.

The following example is given to illustrate the use of the instant rapid curing epoxy compositions in a RIM process. It is understood that the example is an embodiment only and is given for the purpose of illustration and the invention is not to be regarded as limited to any specific components and/or specific conditions recited therein. Unless otherwise indicated, parts and percentages in the example, are parts and percentages by weight.

Epoxy Resin A is a liquid glycidyl polyether of 2,2-bis(4-hydrophenyl)propane having an epoxide equivalent weight of 175–190 and an average molecular weight of about 350.

Epoxy Resin B is a liquid glycidyl polyether of hydrogenated 2,2-bis(4-hydroxyphenyl)propane having an epoxy equivalent weight of about 234 and an average molecular weight of about 568.

PACM-20 is a 100% isomeric mixture of 4,4'-di(cyclohexylamino) methanes containing 20% of the trans, trans-isomer. It is derived from the hydrogenation of methylene dianiline.

V-140 is a commercial long chain amidoamine derived by reacting a partially dimerized $C_{18}$ unsaturated straight chain fatty acid and a polyamine.

PEG-400 is polyethylene glycol having an average molecular weight of about 400.

EXAMPLE I

This example illustrates a typical RIM process using the instant composition.

One hundred parts by weight of Epoxy Resin A containing $\leq 1$ part by weight (phr) of $Ca(NO_3)_2$ [added as $\leq 1.44$ pbw of $Ca(NO_3)_2.4\ H_2O$] and 1 phr of PEG-400 were added to the resin reservoir of a RIM apparatus. The $Ca(NO_3)_2.4\ H_2O$ was dissolved or dispersed in the resin by heating the resin to 50°–60° C. and adding the metal salt while stirring. The PEG-400 was added after about 30 minutes at 50°–60° C. and the resin blend cooled to room temperature.

Then 28 parts by weight of PACM-20 was added to the curative reservoir.

The resin was then brought to 45° to 75° in the resin reservoir and the curative reservoir was brought to 30° to 50° C. Using an Accuratio dispersing and metering system and a Cincinnati Milacron mixing head, the two streams were brought under high pressure of about 1500 psi to the mix head. (Mix Ratio = 3.5±0.2 to 1 Resin:-Curative). The mix head was then opened on a predetermined signal and the two streams flowed together under turbulent mixing conditions and then allowed to flow directly into the mold. After about 60–300 seconds (i.e., 90 seconds) at about 80° to about 160° C., (usually 131° C.) the mold was opened and the part removed. Most of the experimental work was done with a 8"×10"×⅛" flat plaque steel mold wherein the mold was sprayed with a suitable mold release agent (e.g., IMS-416, a silicone type) prior to charging.

The above cured RIM composition exhibited the following physical properties:

| | | |
|---|---|---|
| Tens. Str. (MPa) | 69 | (10.0 × 10³ psi) |
| Tens. Modulus (MPa) | 2966 | (4.30 × 10⁵ psi) |
| Elong. (%) | 6 | |
| Flex Str. (MPa) | 99 | (14.0 × 10³ psi) |
| Flex. Mod. (MPa) | 2745 | (3.98 × 10⁵ psi) |
| % MOD. Retention (120°/30°) | 54 | |
| N. I. Impact (J/m) | 24 | (0.44 ft lb/in) |
| Inst. Impact (J) | 4.4–2.9[a] | (~39 (26)[a] in lb) |
| HDT (°C., 264 psi) | 118 (121)[a] | |
| Heat Sag (in). 1 hr/250° F. | (0.05)[a] | |
| + 1 hr/325° F. | (0.36)[a] | |
| CLTE (in/in/°F.) | 31 × 10⁻⁶ | |

[a]Molded at 152° C.

EXAMPLE II

The procedure of Example I was essentially repeated using the following formulation:

| | |
|---|---|
| Resin A | Epoxy Resin A |
| Curative B | V-140 polyamide |
| $Ca(NO_3)_2 4H_2O$ | $\leq 1.5$ phr |
| PEG-400 | 1 phr |
| Mix Ratio (A:B) | 1.85:1.0 w/w |
| Mold Temperature | 122° C. |

The physical properties of the cured composition were as follows:

| | | |
|---|---|---|
| Tens. Str. (MPa) | 49 | (7.1 × 10³ psi) |
| Tens. Modulus (MPa) | 2690 | (3.90 × 10⁵ psi) |
| Elongation (%) | 8 | |
| Flex Str. (MPa) | 79 | (11.4 × 10³ psi) |
| Flex Mod. (MPa) | 2248 | (3.26 × 10⁵ psi) |
| % Mod. Retention (80°/30°) | 40 | |
| N. I.[a] Impact (J/m) | 30 | (0.55 ft lb/in) |
| Inst. Impact (J) (~2 mph) | 2.3 | (~20 in lb) |
| HDT (°C., 264 psi) | 72 (67)[b] | |
| Heat Sag (in). 1 hr/250° F. | 0.19 | |
| + 1 hr/325° F. | 0.25 | |

[a]Notched Izod
[b]Molded at 134° C.

EXAMPLE III

The procedure of Example I was essentially repeated using the following formulation:

| | |
|---|---|
| Resin A | Epoxy Resin A |

-continued

| Curative B | A 50:50 equivalent mixture of Cyclohexane-diamine and V-140 |
| --- | --- |
| Mix Ratio (A:) | 2.8:1.0 (w/w) |
| Ca(NO$_3$)$_2$.4H$_2$O | ≦1.5 phr |
| PEG-400 | 1.0 phr |
| Mold Temperature | 122° C. |

The physical properties of the cured composition were as follows:

| Tens. Str. (MPa) | 58 | (8.4 × 10$^3$ psi) |
| --- | --- | --- |
| Tens. Modulus (MPa) | 2793 | (4.05 × 10$^5$ psi) |
| Elong. (%) | 5 | |
| Flex Str. (MPa) | 84 | (12.2 × 10$^3$ psi) |
| Flex Mod. (MPa) | 2241 | (3.25 × 10$^5$ psi) |
| % Mod. Retention (80°/30°) | 67 | |
| N. I. Impact (J/m) | 25 | (0.46 ft lb/in) |
| Inst. Impact. (J) | 1.6 | (~14 in lb) |
| HDT (°C., 264 psi) | 90 (93)$^a$ | |
| Heat Sag. (in). 1 hr/250° F. | (0.20–0.31)$^a$ | |
| + 1 hr/325° F. | (0.17–0.34)$^a$ | |
| CLTE$^b$ (in/in/°F.) | (34 × 10$^{-6}$)$^a$ | |

$^a$Molded at 140° C.
$^b$Coefficient of Linear Thermal Expansion

EXAMPLE IV

The procedure of Example I was essentially repeated using the following formulation:

| Resin A | 75 pbw Epoxy Resin A |
| --- | --- |
| | 25 pbw Epoxy Resin B |
| Curative B | PACM-20 |
| Ca(NO$_3$)$_2$.4H$_2$O | ≦1.5 phr |
| PEG 400 | 1 phr |
| Mix Ratio | 4.0:1.0 w/w |
| Mold Temperature | 130° C. |

The physical properties of the cured composition were as follows:

| Tens. Str. (MPa) | 68 | (9.9 × 10$^3$ psi) |
| --- | --- | --- |
| Tens. Modulus (MPa) | 2638 | (3.89 × 10$^5$ psi) |
| Elong. (%) | 7 (10)$^a$ | |
| Flex Str. (MPa) | 99 | (14.3 × 10$^3$ psi) |
| Flex Mod. (MPa) | 2862 | (4.15 × 10$^5$ psi) |
| % Mod. Retention (80°/30°) | 32 | |
| N. I. Impact (J/m) | 29 | (0.52 ft lb/in) |
| Inst. Impact (J) | 2.5 (4.0)$^a$ | (~22 (35)$^a$ in lb) |
| HDT (°C., 264 psi) | 102 (102)$^a$ | |
| Heat Sag (in). 1 hr 250° F. | 0.19–0.27 | |
| + 1 hr 325° F. | 0.45–0.30 | |
| CLTE (in/in/°F.) | 23 × 10$^{-6}$ | |

$^a$Molded at 150° C.

What is claimed is:
1. A rapid curing, storage stable, thermosetting composition, especially suitable for use in reaction injection molding processes comprising
   (1) an epoxy compound containing more than one vicinal epoxy group,
   (2) a curing amount of at least one amino compound containing at least three amino hydrogens,
   (3) a catalytic amount of lithium nitrate or calcium nitrate, and
   (4) from about 0.1 to about 3 parts of a polyalkylene ether glycol per 100 parts by weight of epoxy compound.
2. The composition of claim 1 wherein the epoxy compound is a glycidyl polyether of a polyhydric phenol.
3. The composition of claim 2 wherein the epoxy compound is a glycidyl polyether of 2,2-bis(4-hydroxyphenyl)propane.
4. The composition of claim 2 wherein the epoxy compound is a blend of (a) a glycidyl polyether of 2,2-bis(4-hydroxyphenyl)propane and (b) a glycidyl polyether of hydrogenated 2,2-bis(4-hydroxyphenyl)propane.
5. The composition of claim 1 wherein the amino compound is a cycloaliphatic amine.
6. The composition of claim 5 wherein the cycloaliphatic diamine is hydrogenated methylene dianiline.
7. The composition of claim 5 wherein the cycyloaliphatic diamine is 1,2-diaminocyclohexane.
8. The composition of claim 1 wherein the amino compound is a polyamide.
9. The composition of claim 8 wherein the polyamide is an adduct of a polymeric fatty acid and triethylamine tetramine or diethylene triamine.
10. The composition of claim 1 wherein the amino compound is a blend of hydrogenated methylene dianiline and an adduct of a polymeric fatty acid and triethylene tetramine or diethylene triamine.
11. The composition of claim 1 wherein the catalyst is Ca(NO$_3$)$_2$.
12. The composition of claim 1 wherein the catalyst is LiNO$_3$.
13. The composition of claim 1 wherein the polyalkylene ether glycol is a polyethylene glycol.
14. The composition of claim 13 wherein the polyethylene glycol has an average molecular weight of from about 200 to 600.
15. The composition of claim 1 wherein the catalyst is employed in amounts from about 0.05 to about 5.0 parts per 100 parts by weight of epoxy compound.
16. The composition of claim 1 wherein the weight ratio of catalyst to polyalkylene ether glycol is from about 1:1 to about 1:5.

* * * * *